Figures 1, 5:
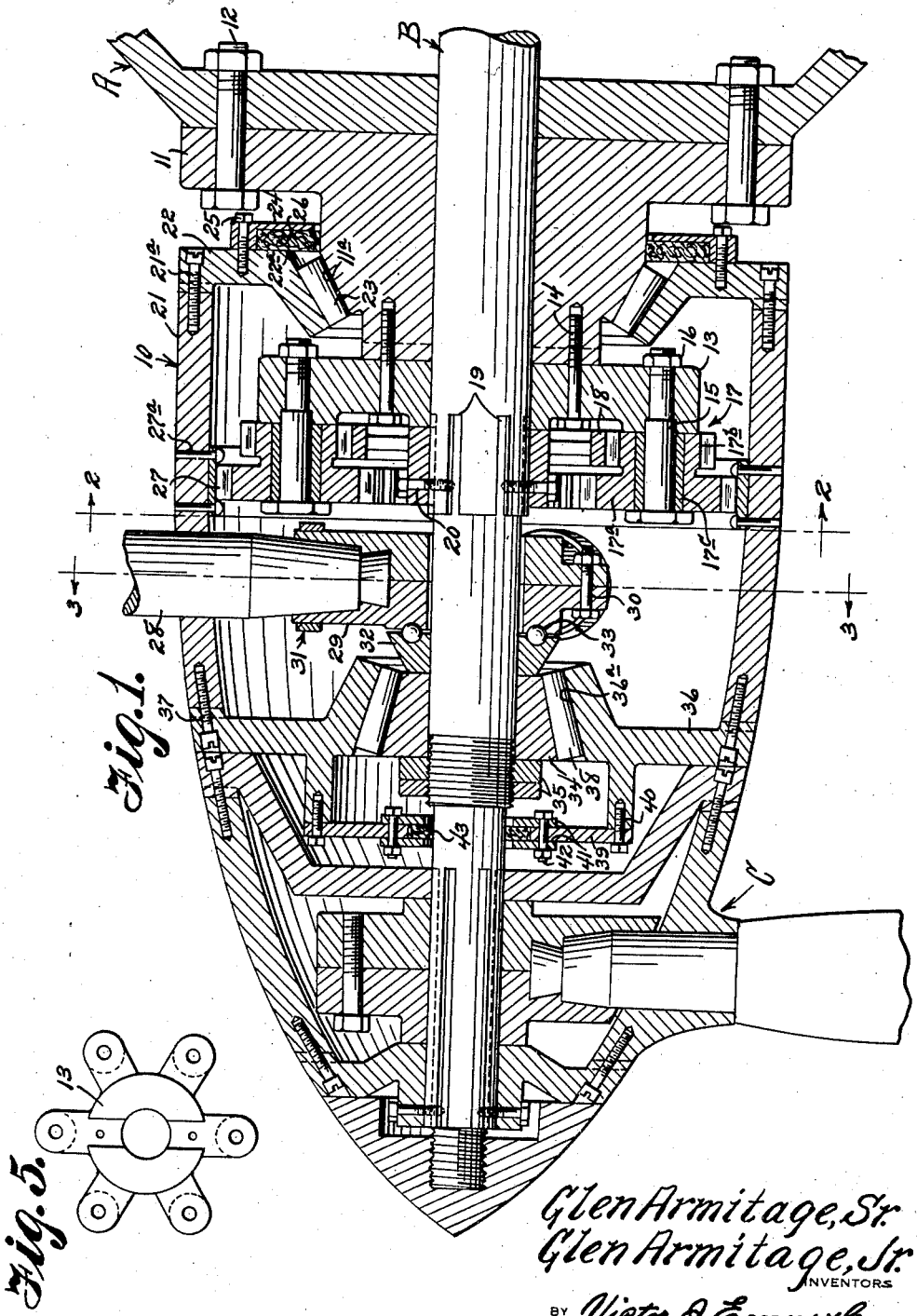

March 10, 1942.   G. ARMITAGE, SR., ET AL   2,275,599
AIRCRAFT PROPELLER CONSTRUCTION
Filed April 29, 1940   2 Sheets-Sheet 1

Glen Armitage, Sr.
Glen Armitage, Jr.
INVENTORS

BY Victor J. Evans & Co.
ATTORNEYS

March 10, 1942.  G. ARMITAGE, SR., ET AL  2,275,599
AIRCRAFT PROPELLER CONSTRUCTION
Filed April 29, 1940.  2 Sheets-Sheet 2
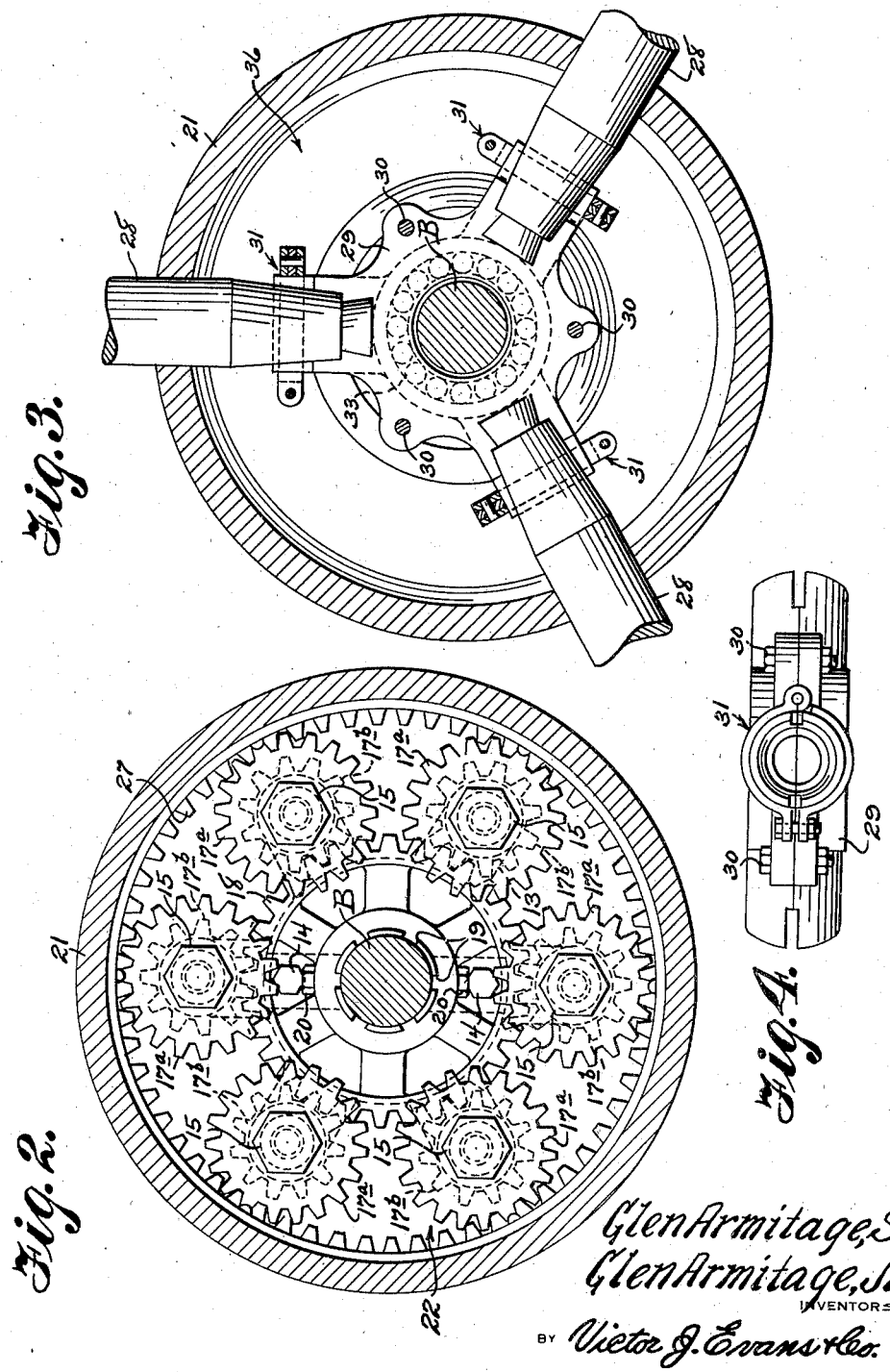
Glen Armitage, Sr.
Glen Armitage, Jr.
INVENTORS
BY Victor J. Evans & Co.
ATTORNEYS Patented Mar. 10, 1942

2,275,599

UNITED STATES PATENT OFFICE 2,275,599

AIRCRAFT PROPELLER CONSTRUCTION

Glen Armitage, Sr., and Glen Armitage, Jr., Redwood Falls, Minn.

Application April 29, 1940, Serial No. 332,374

2 Claims. (Cl. 170—135.5)

This invention relates to improvements in air screws and especially is concerned with a novel air screw of the type comprising a pair of oppositely rotating propellers coacting to prevent slippage.

An important consideration in airplane design is that the vortex of the air screw pulling the airplane acts upon the airplane wings to impart an upward lift to one side and a downward thrust to the other commonly called propeller torque. A common expedient in the past for alleviating this undesirable condition has been to provide weights or other counteracting force in the wing against which the lifting force operates. But this practice has resulted in disadvantageous conditions inasmuch as the propeller torque is dependent both upon the rate of rotation of the propeller and the velocity of the airplane to mention but two of several factors concerned. This undesirable situation, however, is corrected in the type of airplane construction to which the present invention relates by conjoint use of oppositely rotating air screws which impart opposite and hence neutralizing torques.

It is among the more important objects of this invention to provide a novel aircraft propeller construction wherein means is provided for simultaneously rotating in opposite directions a pair of propellers coacting with each other in a manner such that slippage is substantially precluded.

Another object of this invention is to provide means for causing opposite rotation of two propellers operated from a common shaft without requiring the use of concentric shafts or the like.

An advantage of the propeller construction according to this invention and particularly the reversing drive thereof is that the unit or assembly is symmetrical and balanced and may be mounted within the cowling surrounding the propeller hubs.

Noteworthy among the features of the novel aircraft propeller according to the present invention are its simplicity and ruggedness of construction, the former suiting the device to the requirements of manufacture under conditions of mass production and the latter assuring long useful life.

Other objects, advantages and features of the new and improved propeller construction according to the present invention will be apparent to those skilled in this art during the course of the following description.

Regarded in certain of its broader aspects the novel propeller construction according to this invention comprises a pair of propellers, one rigidly and the other freely mounted upon a drive shaft; an internal gear connected to the freely mounted propeller, a spur gear mounted on the shaft and pinions coupling the internal and spur gears in a manner such that the free propeller rotates simultaneously with but in a direction opposite to rotation of the drive shaft; and cowling surrounding the hubs of the propellers and the gears above mentioned.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawings,

Figure 1 is substantially a vertical sectional view of the presently preferred embodiment of this invention illustrating the same mounted on an engine as if in use, Figs. 2 and 3 are respectively vertical transverse sectional views of Fig. 1 taken along the planes designated by the lines 2—2 and 3—3 thereof, Fig. 4 is a side elevational view of the free propeller hub, and Fig. 5 is a top plan view of the spider support forming a part of the device according to this invention.

Referring now to the drawings it will be noticed that the novel propeller construction according to the present invention generally designated by the reference character 10 comprises a forwardly directed tubular extension block 11 mounted by means of bolts 12 on an engine crank case front A, the block being positioned concentric the engine drive shaft B and being provided with a frustoconical bearing race 11a on the external surface thereof substantially as shown. A spider 13 rigidly fastened by bolts 14 to the face of the block 11 presents a plurality of radiating arms on which are mounted stud shafts 15 held upon the spider by bolts 16. The stud shafts extend in substantial parallelism to the axis of the engine drive shaft B and carry freely rotatable thereon pinion gears generally designated by the reference character 17, each of which comprises a large pinion 17a and a small pinion 17b formed from a single block of substance integrally with each other. To facilitate free rotation of the pinions under circumstances of use, sleeves 17c are provided on the surface facing the stud shafts 15.

A spur gear 18 rigidly mounted upon the engine drive shaft B by means including tongues and grooves generally designated by the reference character 19 and bolts 20 meshes with the smaller of each of the pinion gears 17 whereby rotation of the drive shaft results in rotation in opposite direction of the pinion gars.

The sleeve 21 superjacent the forwardly directed portions of the block 11 and the spider 13 together with the pinion 17 mounted thereon is carried upon a plate 22 attached to the sleeve by screws 21a having an inwardly directed frustoconical bearing race 22a which cooperates by means of rollers 23 with the bearing race 11a on the block 11 providing support to the sleeve upon the block. A packing ring 24 held upon the plate 22 by bolts 25 holds packing 26 in a manner such that the interior of the sleeve is substantially sealed as hereinafter will be described.

An internal gear 27 mounted within the sleeve 21 by fastening means 27a meshes with the larger of the pinions 17 in a manner such that rotation of the engine drive shaft B results in rotation in an opposite direction of the sleeve 21.

A first propeller assembly comprising blades 28 mounted in a split hub 29 connected by bolts 30 and provided with clamps generally designated by the reference character 31 for rigidly holding the blade shanks within the hub is positioned concentric the engine drive shaft B in a locality near but in front of a spider and pinion gear assembly above described, the blades extending through close fitting openings formed in the sleeve 21. Forward motion of the propeller assembly is restricted by a collar 32 acting through ball bearings 33, the collar being held in place upon the shaft by a bearing element 34 fixed on the threaded shaft end with lock nuts 35. The plate 36 attached to the front end of the sleeve 21 by bolts 37 is provided with an inwardly directed frustoconical roller race 36a upon which run rollers 38 cooperating with the bearing member 34 above mentioned in a manner such that the sleeve 21 is permitted free rotation about the axis of the drive shaft B but motion of the sleeve in either direction along the axis of the shaft is substantially precluded. It is to be noticed that the first propeller assembly rotates with the sleeve 21 being associated therewith by interengagement of the propeller plates with openings in the sleeve and by pressing of the collar 32 against the ball bearings 33. A seal comprising a plate 39 mounted upon parts of the plate 36 by bolts 40 carries rings 41 attached thereto by bolts 42 holding packing 43, thus permitting enclosure of the interior of the sleeve 21 by retaining lubricant therein in a manner familiar to those skilled in this art.

A second propeller generally designated by the reference character C is rigidly mounted in a hub affixed to the front of the shaft B and rotates therewith as is conventional in this art.

From the foregoing description it will be apparent that rotation of the engine drive shaft B operating through the gears 18, 17b, 17a and 27 causes rotation in opposite direction of the sleeve 21 together with the first propeller including the propeller blades 28 and the second propeller C will simultaneously be rotated in a direction opposite to the direction of rotation of the first propeller.

It is to be understood that this invention is capable of extended application and is not confined to the precise illustrated forms or described construction and, therefore, such changes and modifications may be made therein as do not affect the spirit of the invention nor exceed the scope of the appended claims.

Having thus described the present invention, what it is desired to secure by Letters Patent is:

1. Aircraft propeller construction comprising a forwardly directed tubular extension block mounted on the engine crank case front and surrounding the drive shaft, said block having a frustoconical bearing race formed on the external surface thereof; a rigid spider mounted on the block concentric with the shaft; stud shafts on the spider in parallelism to the drive shaft; freely rotatable pinion gears on the stud shafts; a spur gear mounted on the drive shaft near the spider meshing with the pinion gears; a sleeve circumjacent the extension block and the spider extending forwardly concentric the drive shaft; a plate mounted on the back end of the sleeve having an inwardly directed frustoconical bearing race formed therein and rollers between said race and the race on the extension block; an internal gear on the sleeve meshing with the pinion gears whereby rotation of the drive shaft results in rotation but in an opposite direction of the sleeve; a first propeller freely rotatably mounted on the drive shaft having blades extending through openings in the sleeve whereby sleeve and propeller rotate as a unit; a conical roller bearing mounted on the shaft and a plate on the front of said sleeve cooperating with said conical roller bearing for holding the sleeve against axial motion along the drive shaft, said conical bearing further serving to urge the first propeller toward the spider and prevent movement of the propeller along the shaft; means for sealing lubricant within the sleeve; and a second propeller mounted on the front end of the drive shaft and rotating therewith.

2. An aircraft propeller construction, comprising an engine drive shaft, a propeller rigidly mounted on the outer end of said shaft, an elongated hollow hub surrounding the shaft and having its outer end provided with a bearing connection with the shaft and its inner end having a bearing connection with a crank case, said bearing connections comprising two sets of tapered roller bearings of oppositely directed tapered surfaces, a non-rotating spider carried by the crank case within the hub, a spur wheel on the engine shaft beyond the spider, freely rotatable pinions on the spider and meshing with the spur wheel, an internal gear on the inner face of the elongated hub and meshing with the pinion gears, and propeller blades passing through the elongated hub intermediate the outer and inner bearings and rigidly mounted in a hub loosely mounted on the drive shaft.

GLEN ARMITAGE, Sr.
GLEN ARMITAGE, Jr.